(12) United States Patent
Pitzely (10) Patent No.: US 12,471,008 B2
(45) Date of Patent: *Nov. 11, 2025

(54) METHODS FOR DYNAMICALLY ADJUSTING RANGE OF A WIRELESS SIGNAL

(71) Applicant: Comcast Cable Communications, LLC, Philadelphia, PA (US)

(72) Inventor: David Pitzely, Ashburn, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,350

(22) Filed: May 24, 2024

(65) Prior Publication Data

US 2024/0406847 A1 Dec. 5, 2024

Related U.S. Application Data

(63) Continuation of application No. 14/573,542, filed on Dec. 17, 2014, now Pat. No. 12,022,379.

(51) Int. Cl.
*H04W 48/12* (2009.01)
*H04W 52/08* (2009.01)
*H04W 52/24* (2009.01)
*H04W 88/02* (2009.01)
*H04W 88/08* (2009.01)

(52) U.S. Cl.
CPC .......... *H04W 48/12* (2013.01); *H04W 52/08* (2013.01); *H04W 52/243* (2013.01); *H04W 52/245* (2013.01); *H04W 88/02* (2013.01); *H04W 88/08* (2013.01)

(58) Field of Classification Search
CPC ... H04W 48/12; H04W 52/08; H04W 52/243; H04W 52/245; H04W 88/02; H04W 88/08
See application file for complete search history.

(56) References Cited

U.S. PATENT DOCUMENTS

| | | | |
|---|---|---|---|
| 7,509,131 B2 | 3/2009 | Krumm et al. | |
| 7,565,529 B2 | 7/2009 | Beck et al. | |
| 8,620,269 B2 | 12/2013 | Johar et al. | |
| 9,294,620 B2 | 3/2016 | Fugman et al. | |
| 9,338,606 B2 | 5/2016 | Moshfeghi | |
| 9,661,465 B2 | 5/2017 | Lee | |
| 10,051,563 B2 | 8/2018 | Shen | |
| 11,070,258 B2 | 7/2021 | Perlman et al. | |
| 12,022,379 B2 * | 6/2024 | Pitzely | H04W 52/245 |
| 2004/0203910 A1 | 10/2004 | Hind et al. | |
| 2005/0003827 A1 | 1/2005 | Whelan | |
| 2006/0092889 A1 | 5/2006 | Lyons et al. | |
| 2009/0279519 A1 | 11/2009 | Brisebois et al. | |
| 2010/0085884 A1 | 4/2010 | Srinivasan et al. | |

(Continued)

*Primary Examiner* — Justin T Van Roie
(74) *Attorney, Agent, or Firm* — Ballard Spahr LLP (57) ABSTRACT

An example method can comprise receiving a first wireless signal from a first device at a boundary device. The boundary device can measure one or more properties of the first wireless signal and can transmit information regarding the one or more measured properties of the first wireless signal to the first device, the information regarding the one or more measured properties of the first wireless signal causing the first device to adjust one or more properties of wireless transmission based on the information.

21 Claims, 7 Drawing Sheets (56) References Cited

U.S. PATENT DOCUMENTS

| | | |
|---|---|---|
| 2010/0302981 A1 | 12/2010 | Tsai et al. |
| 2012/0028629 A1 | 2/2012 | Liu et al. |
| 2013/0242852 A1 | 9/2013 | Petros |
| 2013/0250931 A1 | 9/2013 | Abraham et al. |
| 2013/0288704 A1 | 10/2013 | Wirola et al. |
| 2014/0078973 A1 | 3/2014 | Kazmi et al. |
| 2014/0087733 A1 | 3/2014 | Ishida et al. |
| 2014/0302783 A1 | 10/2014 | Aiuto et al. |
| 2015/0163634 A1 | 6/2015 | Meredith et al. |
| 2015/0208248 A1 | 7/2015 | Wang et al. |
| 2015/0281908 A1 | 10/2015 | Venkatraman et al. |
| 2016/0037458 A1 | 2/2016 | Ponnuswamy et al. |
| 2016/0100318 A1 | 4/2016 | Wei |

\* cited by examiner

METHODS FOR DYNAMICALLY ADJUSTING RANGE OF A WIRELESS SIGNAL

CROSS-REFERENCE TO RELATED APPLICATION

This application is a continuation of U.S. patent application Ser. No. 14/573,542 filed Dec. 17, 2014, the content of which is incorporated herein in its entirety.

BACKGROUND

Generally, commercially available wireless communication devices transmit a wireless signal at a fixed signal strength. In scenarios where alteration of the transmission range is desired, solutions typically require altering hardware or adding additional hardware. For example, to increase transmission range, substitution of a higher-gain transmission antenna may be needed. Reducing signal transmission range is often dependent upon the physical surroundings of the wireless communication device. For example, specialty wall or window films can be used to help prevent a wireless signal from escaping a confined space, such as a home or conference room. However, these films are costly and cumbersome to implement. These solutions may also have additional, unintended effects, such as blocking other signals, such as cellular signals, radio communications, and the like. These and other problems are solved by the methods and systems described herein.

SUMMARY

It is to be understood that both the following general description and the following detailed description are exemplary and explanatory only and are not restrictive. Provided are methods and systems for dynamically adjusting a range of a wireless signal. A wireless communication device can be positioned to transmit a wireless signal in a particular area and one or more boundary devices can be positioned near a desired outer boundary for the wireless signal (e.g., a point farthest from the wireless communication device that the wireless signal should reach). The wireless communication device can be configured to transmit the wireless signal at a default strength, (e.g., the maximum strength at which the device is capable of transmitting). The one or more boundary devices can each receive the wireless signal and measure one or more signal properties (e.g., signal strength, interference, and the like) at a boundary position. All of the one or more boundary devices can transmit information regarding the measured one or more signal properties to the wireless communication device. All of the one or more boundary devices can communicate with the wireless communication device on the same or on another wireless network. The wireless communication device can adjust properties of the wireless signal transmission based on the received information. In an aspect, plural boundary devices can be disposed at varied locations relative to the wireless communication device. When plural boundary devices are disposed at different positions relative to the wireless communication device, a footprint of the first wireless signal can be controlled and/or shaped with more specificity. In an aspect, all of the boundary devices can measure the one or more signal properties periodically to ensure that appropriate adjustments have been made and that no further adjustments are required.

In an aspect, an example method can comprise receiving a first wireless signal, from a first device, at a boundary device. The boundary device can measure one or more properties of the first wireless signal and can transmit information regarding the one or more measured properties of the first wireless signal to the first device, causing adjustment of one or more properties of wireless transmission in the first device based on the information.

In another aspect, an example method can comprise a boundary device receiving a first wireless signal from a first device and receiving a second wireless signal from a second device. The boundary device can measure one or more properties of the first wireless signal, and one or more properties of the second wireless signal. The boundary device can transmit information regarding the one or more measured properties of the first wireless signal to the first device to cause an increase in signal strength. Similarly, the boundary device can transmit information regarding the one or more measured properties of the second wireless signal to the second device to cause a decrease in signal strength.

In still another aspect, a wireless communication device can transmit a wireless signal. The wireless communication device can also receive information related to the wireless signal and can adjust one or more properties of the transmission based on the received information.

In another aspect, an example system can comprise a first wireless communication device and a boundary device. The first wireless communication device can comprise a transceiver for transmitting a first wireless signal and for receiving information related to the one or more measured properties of the first wireless signal and a processor for adjusting one or more properties of the first wireless signal based on the received information related to the one or more measured properties of the first wireless signal. The boundary device can comprise a transceiver for receiving the first wireless signal and a processor for measuring one or more properties of the first wireless signal. The boundary device transceiver can further transmit information related to the one or more measured properties of the first wireless signal. The boundary device can transmit the information related to the one or more measured properties of the first wireless signal to the first wireless communication device. The first wireless communication device can receive the information related to the one or more measured properties, and can adjust the one or more properties of the first wireless signal based on the information related to the one or more measured properties.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Some aspects of the present disclosure relate to methods and systems for dynamically adjusting properties of a wireless signal being transmitted by a wireless communication device. Typically, wireless communication devices transmit a wireless signal such that the wireless signal covers a fixed area to form a wireless communication network. However, it can be desirable to modify a range (or other characteristic) of the wireless signal to reduce and/or increase the fixed area and/or otherwise alter the shape of the fixed area, in situations where the wireless communication network is not secured (e.g., a publically-accessible network) and secured (e.g., a private network). A wireless communication device can be positioned to transmit a wireless signal in a particular area, and one or more boundary devices can be positioned near one or more desired outer boundaries for the wireless signal (e.g., a point farthest from the wireless communication device that a usable signal should reach or a point some distance away from the wireless communication device such that a connection to a network provided by the signal cannot be maintained). In another aspect, one or more boundary devices can be positioned at or near an area where transmission of the wireless signal is undesirable. In an aspect, the wireless communication device can comprise one or more omnidirectional antennas and/or one or more directional antennas. The wireless communication device can initially be configured to transmit the wireless signal at a default strength, (e.g., the maximum strength at which the device is capable of transmitting), creating a wireless network. The boundary device can receive the wireless signal, and can measure one or more signal properties (e.g., signal strength, interference, and the like) at a boundary position. The boundary device can then transmit information regarding the measurements to the wireless communication device on another wireless network (or on the same wireless network). The wireless communication device can adjust properties of the wireless signal transmission based on the received information to affect the signal received at the boundary device. For example, the wireless communication device can increase or decrease a signal transmission power level. Multiple boundary devices can be used to shape the wireless network. For example, the wireless communication device can adjust the power provided to each of one or more antennas so that the signal strength measured at each boundary device is within a predefined range, thus shaping the network boundary. In an aspect, the one or more antennas can comprise one or more motorized antennas that are, for example, rotatable, and the wireless communication device can rotate the one or more antennas to affect the signal received at the boundary devices. In another aspect, the wireless communication device can individually adjust a transmission strength of networks transmitting using a particular frequency.

Figure 1:
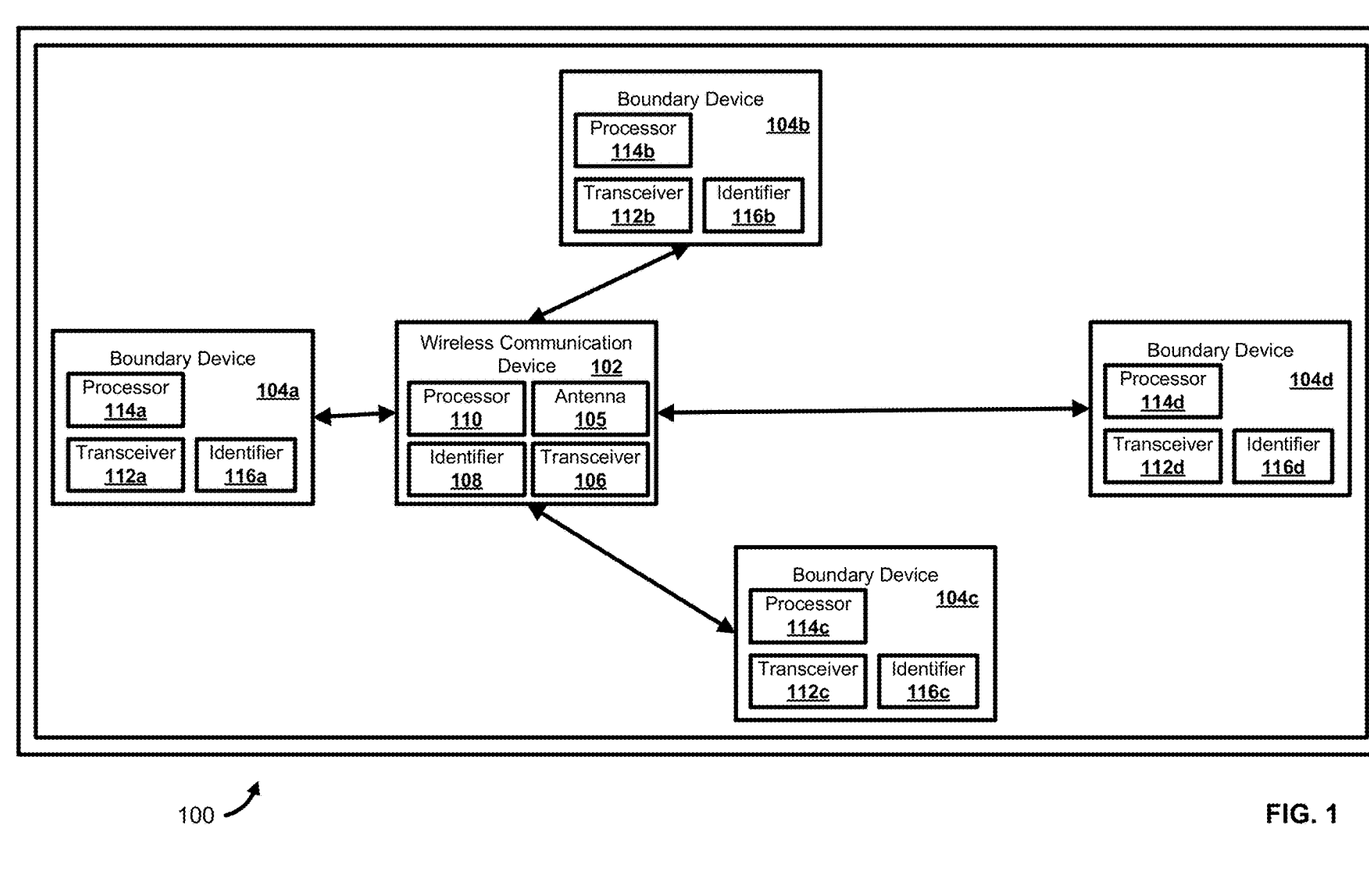
FIG. 1 is a block diagram of an exemplary system.

FIG. 1 is a block diagram illustrating various aspects of an exemplary system 100 in which the present methods and systems can operate. One skilled in the art will appreciate that provided herein is a functional description and that the respective functions can be performed by software, hardware, or a combination of software and hardware.

The system 100 can comprise a wireless communication device 102, such as a wireless router, a wireless switch, or a wireless access point, in communication with one or more boundary devices 104a,b,c,d. In an aspect, each boundary device 104a,b,c,d can comprise a personal computer, a router, or any other device that comprises at least a wireless transceiver and a processor. Each boundary device 104a,b, c,d can be disposed locally relative to the wireless communication device 102. As an example, the wireless communication device 102 and the boundary devices 104a,b,c,d can be disposed within the same room or on the same floor, and the distance between each of the boundary devices 104a,b, c,d and the wireless communication device 102 can be selected based on, for example, a desired maximum transmission distance of a wireless communication signal. The wireless communication device 102 can optionally be in communication with a private and/or public network such as the Internet or a local area network.

In an aspect, the wireless communication device 102 can facilitate the connection of a device, such as a user device, to a network. As a further example, the wireless communication device 102 can be configured as a wireless access point (WAP). In an aspect, the wireless communication device 102 can be configured to allow one or more wireless devices to connect to a wired and/or wireless network using Wi-Fi, Bluetooth or any desired method or standard.

In an aspect, the wireless communication device 102 can be configured as part of a local area network (LAN). As an example, the wireless communication device 102 can comprise a dual band wireless access point. As an example, the wireless communication device 102 can comprise a transceiver 106, and can be configured with a first service set identifier (SSID) (e.g., associated with a public network) to function as a local network for a particular user or users. As a further example, the wireless communication device 102 can be configured with a second service set identifier (SSID) (e.g., associated with a private network or a hidden network) to communicate with the boundary devices 104a,b,c,d.

In an aspect, the wireless communication device 102 can comprise an identifier 108. As an example, one or more identifiers can be or relate to an Internet Protocol (IP) Address IPV4/IPV6 or a content access control address (MAC address) or the like. As a further example, one or more identifiers 108 can be a unique identifier for facilitating communications on the physical network segment. As an example, the identifier 108 can be associated with a physical location of the wireless communication device 102.

In an aspect, the wireless communication device 102 can comprise a processor 110. The processor 110 can be capable of adjusting wireless transmission properties of the wireless communication device 102 to affect the properties of the wireless communication signal. As examples, the wireless communication device 102 can adjust properties such as wireless channel, transmission strength, uplink quality of service, downlink quality of service, and a service priority.

In an aspect, each of the boundary devices 104a,b,c,d can connect to the first service set identifier (SSID) (e.g., associated with a public network) to receive a transmitted wireless communication signal from the wireless communication device 102 using a corresponding transceiver 112a, b,c,d. As a further example, the transceiver 112a,b,c,d can be configured to connect to the second service set identifier (SSID) (e.g., associated with the private network or the hidden network) to communicate directly with the wireless communication device 102.

In another aspect, each of the boundary devices 104a,b, c,d can connect to an SSID of the wireless communication device to receive a transmitted wireless communication signal using the transceiver 112a,b,c,d. The transceiver 112a,b,c,d can also be configured to transmit information to the wireless communication device 102 on the same SSID.

In an aspect, each boundary device 104a,b,c,d can comprise a processor 114a,b,c,d for measuring various properties of the wireless communication signal transmitted by the wireless communication device 102 and received through the first SSID. For example, the processor 114a,b,c,d can measure properties such as signal strength, channel interference, frequency band interference, and the like. For example, any signal properties that can be gathered using the transceiver 112a,b,c,d and an antenna can be measured using the processor 114a,b,c,d.

In an aspect, each boundary device 104a,b,c,d can comprise an identifier 116a,b,c,d. As an example, one or more identifiers can be or relate to an Internet Protocol (IP) Address IPV4/IPV6 or a medium access control address (MAC address) or the like. As a further example, the identifiers 116a,b,c,d can be unique identifiers for facilitating communications on the physical network segment. In an aspect, each boundary device 104a,b,c,d can comprise a distinct identifier 116a,b,c,d. As an example, the identifiers 116a,b,c,d can be associated with a physical location of the boundary device 104a,b,c,d.

In an aspect, the wireless communication device 102 can comprise an omnidirectional antenna for transmitting the wireless communication signal. According, adjusting power provided to the omnidirectional antenna affects the range of the wireless communications, but produces a network footprint having a similar shape. In another aspect, when adjusting the shape of the network footprint is desirable, the wireless communication device 102 can comprise one or more directional antennas. One or more boundary devices 104a,b,c,d can be associated with each of the one or more directional antennas. Information received from each boundary device 104a,b,c,d can be used to adjust transmission settings for a particular one of the directional antennas, allowing for manipulation of the shape of the network footprint. As an example, a wireless communication device 102 can comprise one or more directional antennas 105, and each of the one or more directional antennas 105 can have an associated transceiver 106. The wireless communication device 102 can receive and interpret data coming from the one or more boundary devices 104a,b,c,d to adjust individual settings of each transceiver 106. One or more of the directional antennas can be moved to increase accuracy, for example, and the changes in the signal at the one or more boundary devices 104a,b,c,d can be measured and provided to the wireless communication device to re-adjust the network. For example, this feature is useful when it is desirable to provide network coverage in substantially all of a long rectangular room, such as a conference room or hallway, without allowing the signal to pass through the walls.

Figure 2:
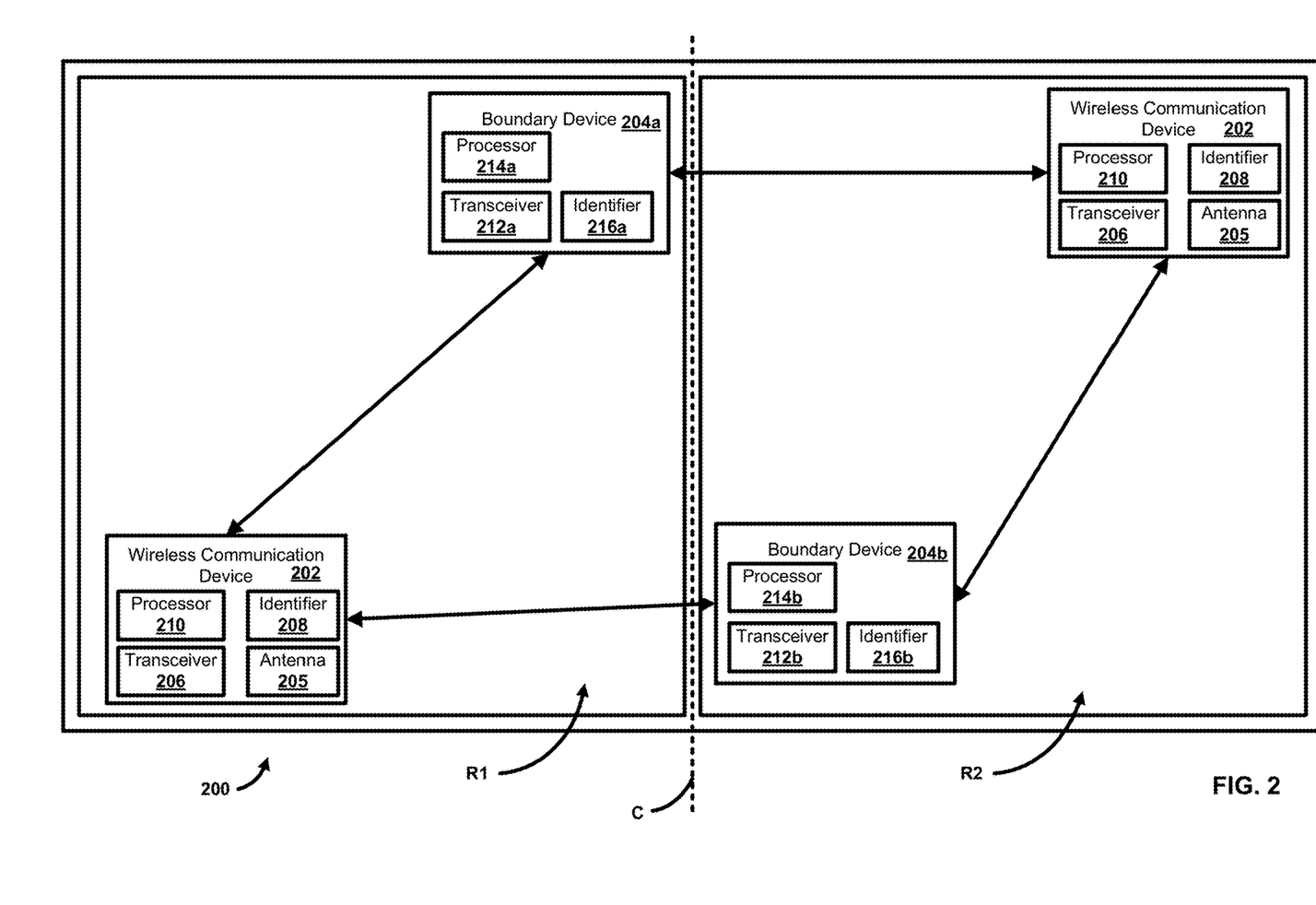
FIG. 2 is a block diagram of another exemplary system.

FIG. 2 is a block diagram illustrating various aspects of an exemplary system 200 in which the present methods and systems can operate. One skilled in the art will appreciate that provided herein is a functional description and that the respective functions can be performed by software, hardware, or a combination of software and hardware. In particular, FIG. 2 shows the system 200 for use in a shared space, such as an apartment complex or office space, with multiple rooms R1, R2.

The system 200 can comprise a plurality of wireless communication devices 202, such as a wireless router, a wireless switch, or a wireless access point, each in communication with a plurality of boundary devices 204a,b. In an aspect the boundary devices 204a,b can be disposed such that each boundary device is located in a separate room. For example, the boundary device 204a can be disposed in the room R1 and the boundary device 204b can be disposed in the room R2. In an aspect, each boundary device 204a,b can comprise a personal computer, a router, or any other device that includes at least a wireless transceiver and a processor. Each boundary device 204a,b can be disposed locally relative to connected wireless communication devices 202. As an example, wireless communication devices 202 and their connected boundary devices 204a,b can be disposed within the same room or on the same floor, and the distance between the boundary devices 204a,b and the wireless communication device 202 can be selected based on a desired maximum transmission distance of a wireless communication signal. Each boundary device 204a,b can optionally be connected to a plurality of wireless communication devices 202. As an example, boundary devices 204a,b can be connected to two wireless communication devices 202 to establish a border C (shown as a dashed line) between the transmission areas of the wireless communications devices 202 and to help limit or prevent overlap of the networks. Each wireless communication device 202 can optionally be in communication with a private and/or public network such as the Internet or a local area network (LAN).

In an aspect, each wireless communication device 202 can facilitate the connection of a device, such as a user device, to the network. As a further example, each wireless communication device 202 can be configured as a wireless access point (WAP). In an aspect, each wireless communication device 202 can be configured to allow one or more wireless devices to connect to a wired and/or wireless network using Wi-Fi, Bluetooth or any desired method or standard.

In an aspect, each wireless communication device 202 can be configured as a local area network (LAN). As an example, each wireless communication device 202 can comprise a dual band wireless access point. As an example, each wireless communication device 202 can comprise one or more directional antennas 205, and each of the one or more directional antennas 205 can have an associated transceiver 206. Further, each wireless communication device 202 can be configured with a first service set identifier (SSID) (e.g., associated with a public network) to function as a local network for a particular user or users. As a further example, each wireless communication device 202 can be configured with a second service set identifier (SSID) (e.g., associated with a private network or a hidden network) to communicate with connected boundary devices 204a,b.

In an aspect, each wireless communication device 202 can comprise an identifier 208. As an example, one or more identifiers can be or relate to an Internet Protocol (IP) Address IPV4/IPV6 or a content access control address (MAC address) or the like. As a further example, one or more identifiers 208 can be a unique identifier for facilitating communications on the physical network segment. As an example, the identifier 208 can be associated with a physical location of the wireless communication device 202.

In an aspect, the wireless communication device 202 can comprise a processor 210. The processor 210 can be capable of adjusting wireless transmission properties of at least the first SSID of the wireless communication device 202.

In an aspect, each boundary device 204a,b can connect to the first service set identifier (SSID) (e.g., associated with a public network) to receive a transmitted wireless communication signal from one or more wireless communication devices 202, using a corresponding transceiver 212a,b. As a further example, each boundary device transceiver 212a,b can be configured to connect to the second service set identifier (SSID) (e.g., associated with the private network or the hidden network) to communicate directly with the one or more wireless communication devices 202.

In another aspect, the boundary devices 204a,b can connect to an SSID of the wireless communication device to receive a transmitted wireless communication signal using the respective transceivers 212a,b. Each transceiver 212a,b can also be configured to transmit information to the wireless communication device 202 on the same SSID.

In an aspect, each boundary device 204a,b can comprise a processor 214a,b for measuring various properties of the wireless communication signal transmitted by each connected wireless communication device 202 and received through the first SSID. For example, the processor 214a,b can measure properties such as signal strength, channel interference, frequency band interference, a signal measurement, a noise measurement, a signal to noise ratio, and the like. Accordingly, each of the wireless communication devices 202 can receive information regarding its respective wireless communication signal from both the boundary device 204a and the boundary device 204b. This can help facilitate more detailed shaping of a network footprint from each wireless device 202.

In an aspect, each of the boundary devices 204a,b can comprise a respective identifier 216a,b. As an example, one or more identifiers can be or relate to an Internet Protocol (IP) Address IPV4/IPV6 or a medium access control address (MAC address) or the like. As a further example, each of the identifiers 216a,b can be a unique identifier for facilitating communications on the physical network segment. In an aspect, each boundary device 204a,b can comprise a distinct identifier 216a,b. As an example, the identifiers 216a,b can be associated with a physical location of the boundary device 204a,b.

Figure 3:
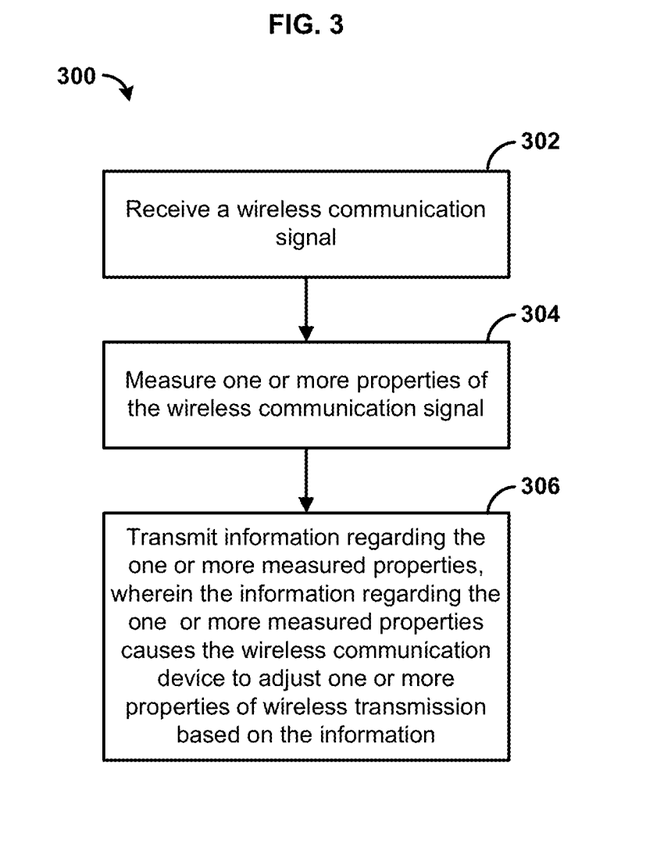
FIG. 3 is a flow chart illustrating an example method.

FIG. 3 shows an exemplary method 300. In step 302, a boundary device, such as the boundary device 104 or the boundary device 204, can receive a wireless communication signal from a wireless communication device, such as the wireless communication device 102 or the wireless communication device 202. In an aspect, the wireless communication signal can be a Wi-Fi signal in compliance with Institute of Electrical and Electronics Engineers (IEEE) 802.11 standards. In another aspect, the wireless communication signal can be any other wireless transmission such as, for example, a Bluetooth (IEEE 802.15.1) transmission. In an aspect, the wireless communication signal can be protected via known security protocols, such as Wi-Fi Protected Access II (WPA2), Wi-Fi protected Access (WPA), Wired Equivalent Privacy (WEP), or the like, or the wireless communication signal can be unsecured. In an aspect, the wireless communication device can comprise a wireless router, a wireless switch, a wireless access point, a personal computer, a tablet computer, a smartphone, or the like. In an aspect, the boundary device can be any device that comprises a wireless transceiver and a processor. For example, the boundary device can be a wireless router, a wireless access point, a computer, a media streaming device, or the like.

In step 304, the boundary device can measure one or more properties of the received wireless communication signal. In an aspect, the one or more properties measured can comprise signal strength, channel interference, frequency band interference, and/or one or more of a signal measurement, a noise measurement, a signal to noise ratio, and the like.

In step 306, the boundary device can transmit information regarding the one or more properties measured to the wireless communication device. In an aspect, the transmitted information can comprise the actual measurements from the boundary device. In another aspect, the information can comprise instructions to adjust one or more properties of the wireless communication signal. For example, the information can comprise an instruction to increase or decrease the one or more properties by a particular amount, or to set the one or more properties to a particular value. As a particular example, the boundary device can transmit one or more of a network name, a transmission channel, a signal width, a transmission band, security information, a signal strength measurement, a noise measurement, detected protocols, and the like. In an aspect, the boundary device can transmit the information regarding the one or more properties to a device associated with the wireless communication device. As examples, the boundary device can transmit the information to a device acting as a proxy to the wireless communication device, to a device in communication with the wireless communication device, or a device otherwise associated with the wireless communication device. In an aspect, the boundary device can also transmit a tolerance value. In another aspect, the wireless communication device can establish the tolerance value. The tolerance value can provide an acceptable variance from a target value for one or more of the data items transmitted by the boundary device. This can be useful when, for example, an edge of the network is to extend past the boundary device.

In an aspect, the information regarding the one or more properties measured can be transmitted to the wireless communication device using a wireless network separate from the wireless communication network used to transmit the wireless communication signal. In an aspect, the separate wireless network can be a private wireless network. For example, the separate wireless network can be secured using a hardware whitelist so that only the boundary device and the wireless communication device can communicate using the network. As another example, the separate wireless network can be secured using a security protocol, such as WPA2, WPA, WEP, and the like. In an aspect, the use of the separate network can help to reduce traffic on the wireless communication network, and help to ensure that the boundary device is the device transmitting information to the wireless communication device.

In an aspect, the information regarding the one or more properties of the wireless signal transmitted by the boundary device can cause the wireless communication device to adjust one or more properties of wireless transmission. In an aspect, the wireless communication device can receive the information regarding the one or more properties of the wireless signal and can adjust the one or more properties of the wireless signal based on the received information. As a particular example, the one or more properties measured by the boundary device can comprise signal strength, with the desired signal strength measured at the boundary device being within a predetermined range. For example, the wireless communication device can rely on analysis software and/or firmware to analyze the information regarding the one or more properties of the wireless signal transmitted by the boundary device. When the analysis of the received information regarding the one or more properties of the wireless signal indicates that the signal strength measured at the boundary is outside of the predetermined range, the wireless communication device can increase or decrease the power to the antenna to affect the signal strength. For example, the analysis software and/or firmware can adjust one or more properties of a configuration file used to establish one or more operating parameters of the wireless communication device on the basis of the received information regarding the one or more properties of the wireless signal, thereby adjusting one or more properties of the wireless transmission. For example, a voltage applied to the antenna of the wireless communication device can be adjusted to thereby adjust the signal strength of the wireless signal.

The ratio of power available at the input of a receiving antenna to output power to the transmitting antenna can be, in ideal situations, given by the Friis transmission equation:

$$P_r = P_t + G_t + G_r + 20\log_{10}\left(\frac{\lambda}{4\pi R}\right)$$

where $P_r$ is the power available at the input of the receiving antenna, Pt is the output power at the transmitting antenna, Gr is the antenna gain of the receiving antenna in decibels, Gt is the antenna gain of the transmitting antenna in decibels, A is the signal wavelength, and R is the distance between the antennas. Antenna gain is a physical property of the antenna, and thus does not change for a given antenna. Similarly, distance between the two antennas can be assumed to be constant in most situations. Accordingly, adjustments made to the output power of the transmitting antenna should see proportional changes to power available at the input of the receiving antenna.

In an aspect, the process of measuring the one or more properties of the wireless signal at the boundary device can be repeated periodically. When the one or more properties can be re-measured, the boundary device again can transmit information regarding the measured properties and cause the wireless communication device to adjust one or more properties of wireless transmission if additional adjustment is warranted. Alternatively, the boundary device can transmit an approval message indicating that the one or more properties have been appropriately adjusted.

Figure 4:
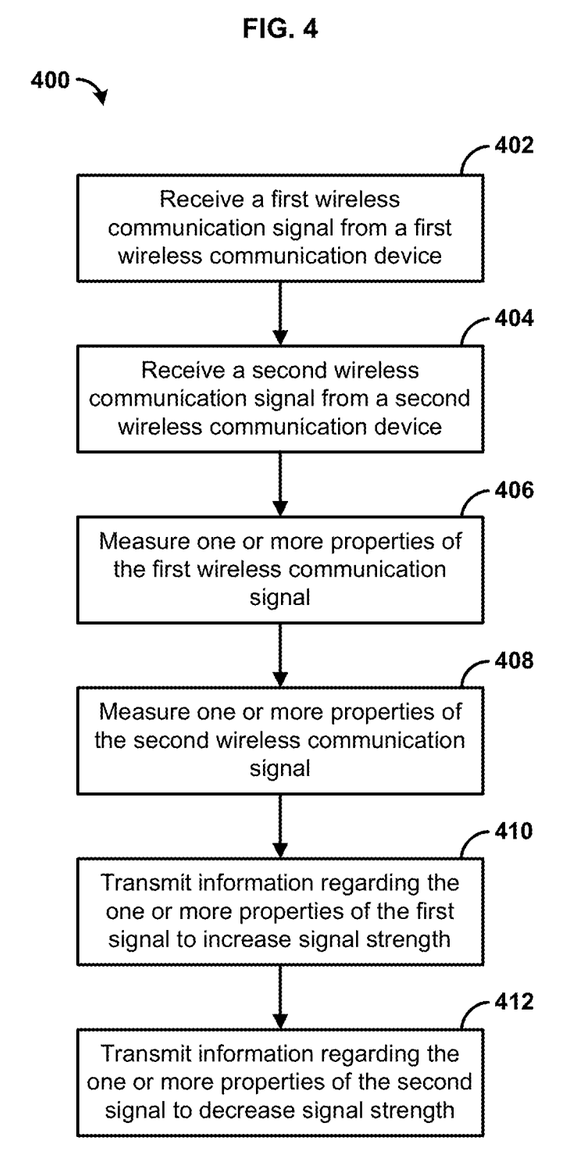
FIG. 4 is a flow chart illustrating another example method.

FIG. 4 shows another exemplary method. In step 402, a boundary device, such as the boundary device 104 or the boundary device 204, can receive a first wireless communication signal from a first wireless communication device, such as the wireless communication device 102 or the wireless communication device 202. In an aspect, the first wireless communication signal can be a Wi-Fi signal in compliance with IEEE 802.11 standards. In another aspect, the wireless communication signal can be any other wireless transmission such as, for example, a Bluetooth (IEEE 802.15.1) transmission. In an aspect, the first wireless communication signal can be protected via known security protocols, such as WPA2, WPA, WEP, or the like, or the first wireless communication signal can be unsecured. In an aspect, the boundary device can be any device that comprises a wireless transceiver and a processor. For example, the boundary device can be a wireless router, a wireless access point, a computer, or the like. In an aspect, the first wireless communication device can comprise a wireless router, a wireless switch, a wireless access point, a personal computer, a tablet computer, a smartphone, or the like.

In step 404, the boundary device can receive a second wireless communication signal from a second wireless communication device. In an aspect, the second wireless communication signal can be a Wi-Fi signal in compliance with Institute of Electrical and Electronics Engineers (IEEE) 802.11 standards. In an aspect, the second wireless communication signal can be protected via known security protocols, such as WPA2, WPA, WEP, or the like, or the second wireless communication signal can be unsecured. In an aspect, the second wireless communication device can comprise a wireless router, a wireless switch, a wireless access point, a personal computer, a tablet computer, a smartphone, or the like, and can be the same type of device as the first wireless communication device, or a different type.

In step 406, the boundary device can measure one or more properties of the received first wireless communication signal. In an aspect, the one or more properties measured can comprise signal strength, channel interference, and/or frequency band interference, and the like. Similarly, in step 408, the boundary device can measure one or more properties of the received second wireless communication signal. For example, signal strength, channel interference, and/or frequency band interference, and the like, can be measured.

In step 410, the boundary device can transmit first information regarding the one or more measured properties of the first wireless communication signal to the first wireless communication device. In an aspect, the transmitted first information can comprise the actual measurements from the boundary device. In another aspect, the first information can comprise instructions to adjust one or more properties of transmission of the first wireless communication signal. For example, the first information can comprise an instruction to increase or decrease the one or more properties of transmission by a particular amount, or to set the one or more properties of transmission to a particular value. In an aspect, the boundary device can transmit one or more of a network name, a transmission channel, a signal width, a transmission band, security information, a signal strength measurement, a noise measurement, detected protocols, and the like. In an aspect, the boundary device also transmits a tolerance value that provides an acceptable variance from a target value for one or more of the measurements transmitted by the boundary device. As a particular example, the boundary device can transmit first information indicating that the power to the antenna of the first wireless communication device should be increased so that the signal strength from the first wireless communication device can be increased.

In step 412, the boundary device can transmit second information regarding the one or more measured properties of the second wireless communication signal to the second wireless communication device. In an aspect, the transmitted second information can comprise the actual measurements from the boundary device. In another aspect, the second information can comprise instructions to adjust one or more properties of transmission of the first wireless communication signal. For example, the second information can comprise an instruction to increase or decrease the one or more properties of transmission by a particular amount, or to set the one or more properties of transmission to a particular value. In an aspect, the boundary device can transmit one or more of a network name, a transmission channel, a signal width, a transmission band, security information, a signal strength measurement, a noise measurement, detected protocols, and the like. In an aspect, the boundary device also transmits a tolerance value that provides an acceptable variance from a target value for one or more of the measurements transmitted by the boundary device. As a particular example, the boundary device can transmit second information indicating that the power to the antenna of the second wireless communication device should be decreased so that the signal strength from the second wireless communication device is decreased. As another example, the boundary device can transmit second information indicating that there is significant channel interference on the channel used by the second wireless communication device and indicating that the second wireless communication device should switch to operating on a less congested channel.

Figure 5A:
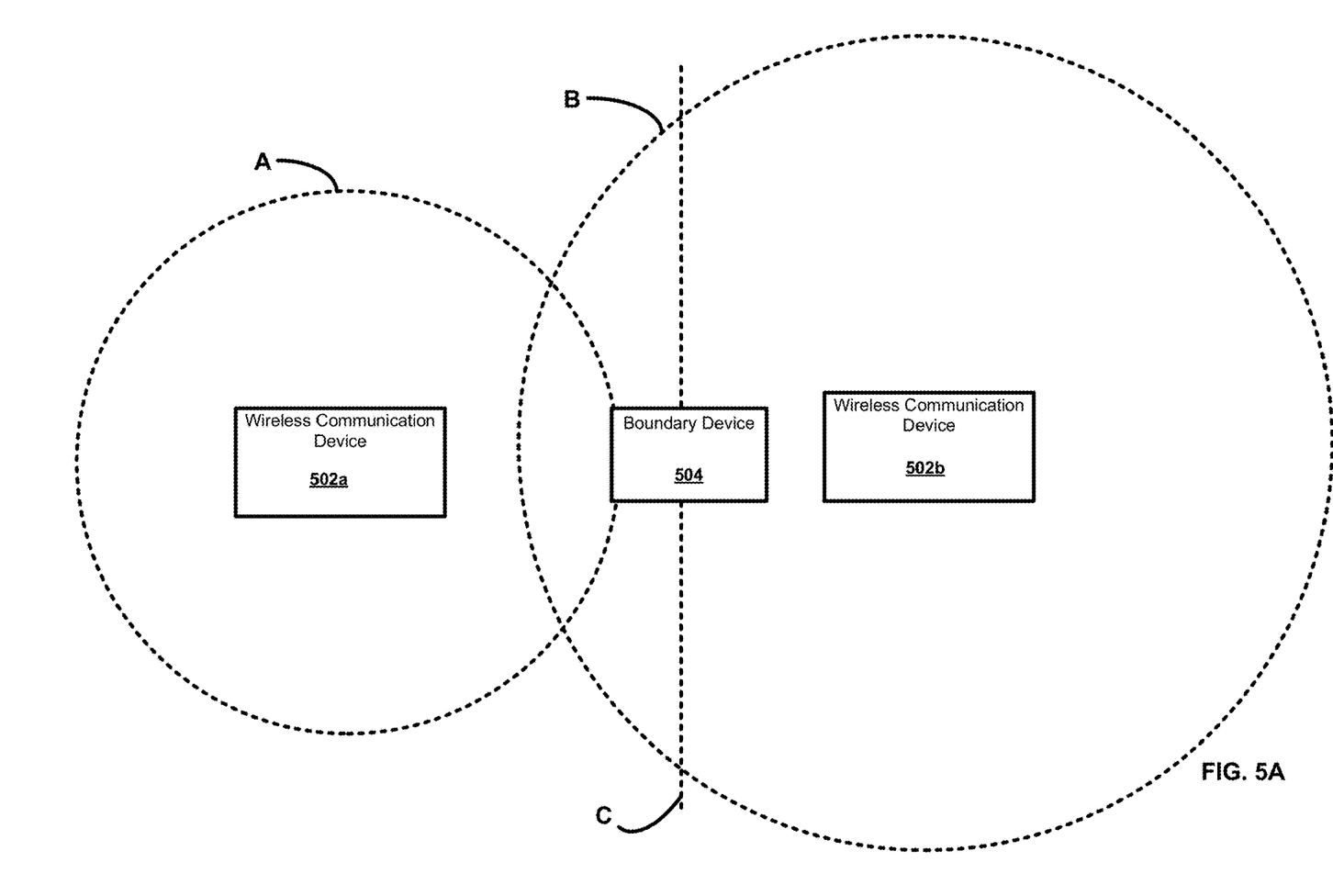
FIGS. 5A and 5B illustrate an example system in use.

As a particular example, FIG. 5A shows a first wireless communications device 502a and a second wireless communication device 502b. A boundary device 504 can be located between the first and second wireless communication devices 502a,b at a desired boundary C, shown as a dashed line. The first wireless communication device can transmit a first signal to enable, support or create a first wireless network having a footprint A. Similarly, the second wireless communication device 502b can transmit a second signal to enable, support or create a second wireless network having a footprint B. As shown in FIG. 5A, the footprints A and B of the first and second wireless networks overlap, and the footprint B crosses over the boundary C.

The boundary device 504 can be disposed between the first and second wireless communication devices 502a,b to establish the boundary C between the first and second networks. This can be desirable, for example, in shared occupancy space, such as apartment buildings, office buildings, or other spaces where a user may desire to provide a wireless network for user purposes without extending the wireless network beyond the user's area of control. The boundary device 504 can transmit first information regarding one or more measured properties of the first network to the first wireless communication device 502a and second information regarding one or more measured properties of the second network to the second wireless communication device 502b. As shown in FIG. 5A, the footprint A of the first network is such that any signal transmitted beyond the boundary device 504 would not be usable. The footprint B of the second network is such that a usable signal is being transmitted beyond the boundary device 504.

Figure 5B:
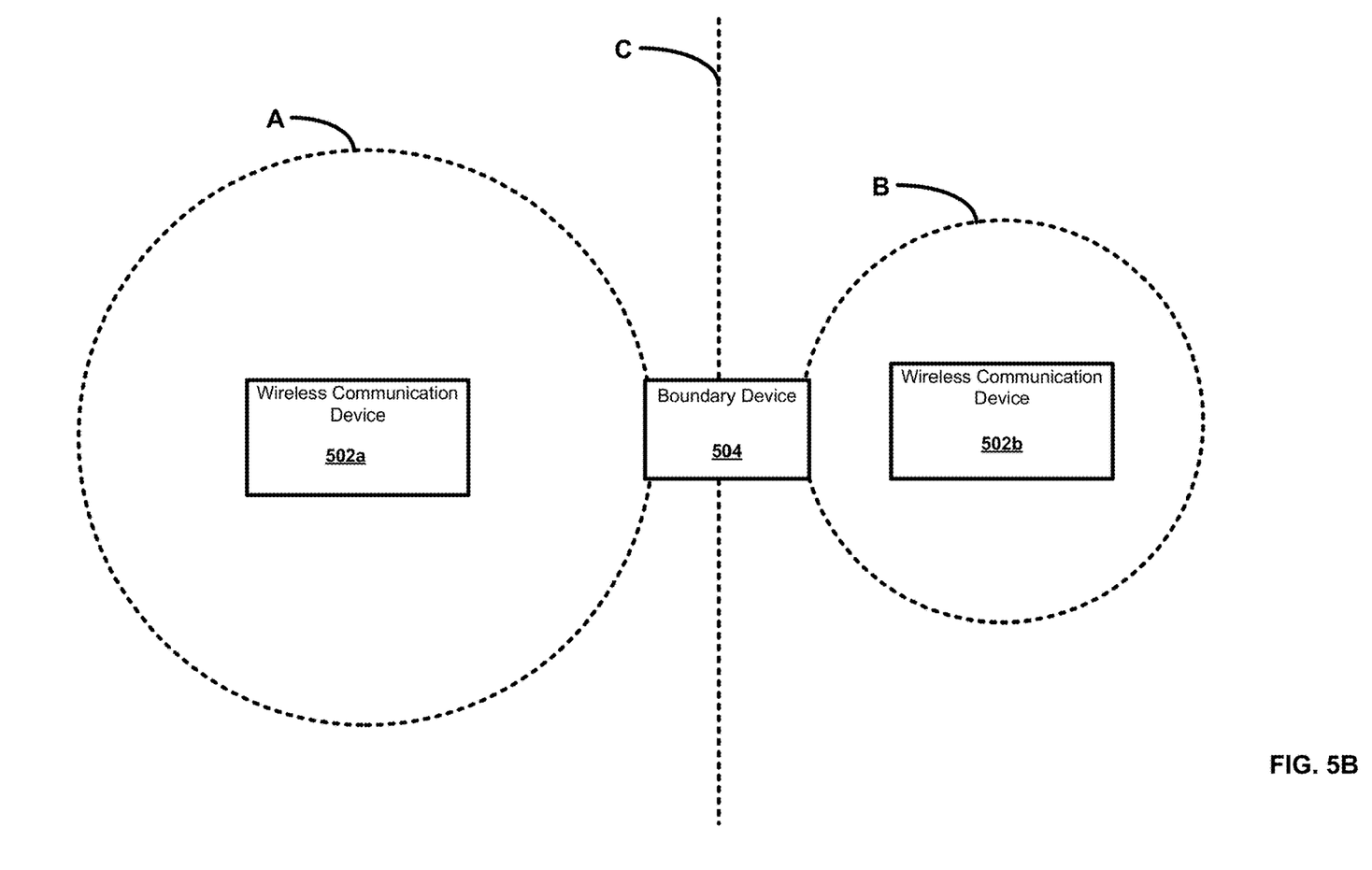

The first wireless device 502a can receive the first information from the boundary device 504. A determination can be made that no changes are needed to the properties of wireless transmission in the first wireless communication device 502a. The second wireless device 502b can receive the second information from the boundary device 504. Based on the received second information, the second wireless device 502b can adjust properties of wireless transmission for the second wireless network. These adjustments to the properties of wireless transmission can cause a shift in the footprint B of the second wireless communication network so that the second wireless communication device 502*b* does not transmit a usable signal beyond the boundary device 504, as shown in FIG. 5B.

In an aspect, the first information regarding the one or more properties measured from the first wireless communication signal and/or the second information regarding the one or more properties measured from the second wireless communication signal can be transmitted from the boundary device using a wireless network separate from the wireless communication network used to receive either the first wireless communication signal or the second wireless communication signal. In another aspect, the first information regarding the one or more properties of the first wireless communication signal can be transmitted on a network separate from the network used to transmit the second information regarding the one or more properties of the second wireless communication signal. In an aspect, the separate wireless networks can be private wireless networks. For example, the separate wireless networks can be secured using a hardware whitelist so that only the boundary device and the wireless communication device can communicate using the network. In another aspect, the separate wireless network can be secured using a security protocol, such as WPA2, WPA, WEP, and the like. In an aspect, the use of the separate network can help to reduce traffic on the wireless communication network, and help to ensure that the boundary device is the device transmitting information to the wireless communication device.

In an aspect, the boundary device can re-measure the one or more properties of the first wireless signal. For example, one or more properties of the first wireless signal can be measured periodically. When the one or more properties of the first wireless communication signal are re-measured, the boundary device again can transmit information regarding the measured properties and the tolerance to the first wireless communication device. The wireless communication device can then interpret the re-measured values transmitted by the boundary device. As an example, if the measured values are still outside of the tolerance specified by the boundary device, the wireless communication device can re-adjust the transmission properties to affect the signal properties measured at the boundary device. Alternatively, if the measured values are within the tolerance at that boundary device, the transmission (including the re-measured values) can be interpreted at the wireless communication device as an approval message.

Similarly, in another aspect, the boundary device can re-measure the one or more properties of the second wireless signal. For example, one or more properties of the second wireless signal can be measured periodically. When the one or more properties of the second wireless communication signal are re-measured, the boundary device again can transmit information regarding the measured properties and the tolerance to the first wireless communication device. The wireless communication device can then interpret the re-measured values transmitted by the boundary device. As an example, if the measured values are still outside of the tolerance specified by the boundary device, the wireless communication device can re-adjust the transmission properties to affect the signal properties measured at the boundary device. Alternatively, if the measured values are within the tolerance at that boundary device, if the transmission (including the re-measured values) can be interpreted at the wireless communication device as an approval message.

Figure 6:
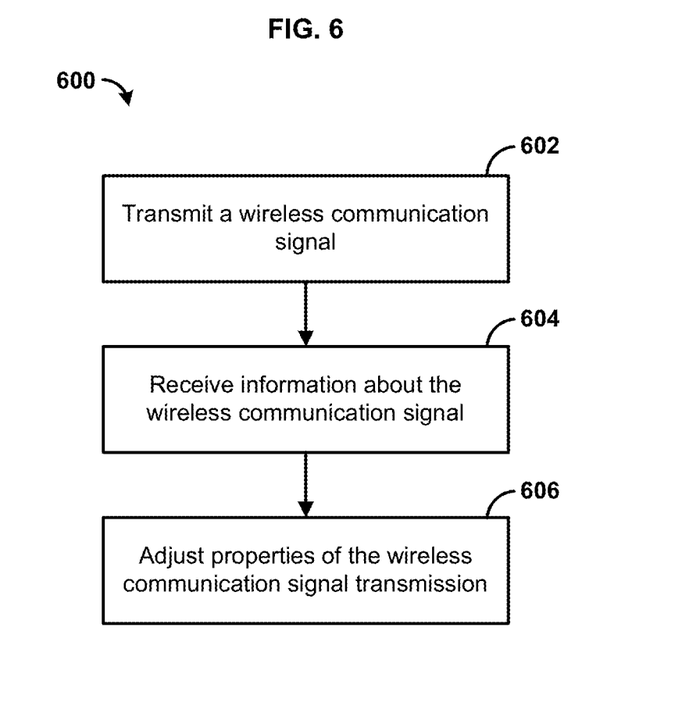
FIG. 6 is a flow chart of a third example method.

FIG. 6 shows another exemplary method 600. In step 602, a wireless communication device transmits a wireless communication signal. In an aspect, the wireless communication device can comprise a wireless router, a wireless switch, a wireless access point, a personal computer, a tablet computer, a smartphone, or the like. In an aspect, the wireless communication signal can be a transmitted Wi-Fi signal in compliance with Institute of Electrical and Electronics Engineers (IEEE) 802.11 standards. In an aspect, the wireless communication signal can be any other wireless transmission, such as a Bluetooth (IEEE 802.15.1) transmission. In an aspect, the wireless communication signal can be protected via known security protocols, such as WPA2, WPA, WEP, or the like, or can be unsecured.

In step 604, the wireless communication device can receive information related to the wireless communication signal from a boundary device. In an aspect, the boundary device can be any device that comprises a wireless transceiver and a processor. For example, the boundary device can comprise a wireless router, a wireless access point, a computer, or the like. In an aspect, the received information related to the wireless communication can comprise measurements of one or more properties of the wireless communication signal as received at the boundary device. In another aspect, the received information can comprise instructions to adjust one or more properties of the transmission of the wireless communication signal. For example, the information can comprise an instruction to increase or decrease one or more properties of transmission by a particular amount, or to set the one or more properties of transmission to a particular value. In an aspect, the boundary device can transmit one or more of a network name, a transmission channel, a signal width, a transmission band, security information, a signal strength measurement, a noise measurement, detected protocols, and the like. In an aspect, the boundary device can also transmit a tolerance value, which provides an acceptable variance from a target value for one or more of the data items measured at the boundary device. As a particular example, the one or more properties measured by the boundary device can comprise signal strength, with the desired signal strength measured at the boundary device being within a predetermined range. The received information can indicate that the signal strength measured at the boundary is outside of the predetermined range.

In an aspect, the wireless communication device can receive information related to the wireless communication signal periodically. For example, the information can be received one per second, once per minute, or the like. In an aspect, the information related to the one or more properties of the wireless communication signal can be received at the wireless communication device using a wireless network separate from the wireless communication network used to transmit the wireless communication signal. In an aspect, the separate wireless network can be a private wireless network. For example, the separate wireless network can be secured using a hardware whitelist so that only the boundary device and the wireless communication device can communicate using the network. In another aspect, the separate wireless network can be secured using a security protocol, such as WPA2, WPA, WEP, and the like. In an aspect, the use of the separate network can help to reduce traffic on the wireless communication network, and help to ensure that the boundary device is the device transmitting information to the wireless communication device.

In step 606, the wireless communication device can adjust one or more properties of transmission of the wireless communication signal based on the received information related to the wireless communication signal. For example, the wireless communication device can increase or decrease the power to the antenna to affect the signal strength depending on information regarding the signal strength received from the boundary device.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   sending, via a device over a first Wi-Fi network using a first signal property, a wireless signal;
   receiving, by the device from a first boundary device, over a second Wi-Fi network separate from the first Wi-Fi network, first information related to the wireless signal;
   receiving, at the device from a second boundary device, over the second Wi-Fi network, second information related to the wireless signal; and
   adjusting the first signal property based on the first information and the second information.

2. The method of claim 1, further comprising:
   sending, via the device over the first Wi-Fi network using the adjusted first signal property, a second wireless signal; and
   receiving, by the device from the first boundary device, an approval message based on the adjusted first signal property of the second wireless signal, wherein the approval message confirms the adjusted first signal property of the second wireless signal.

3. The method of claim 2, further comprising receiving, by the device from the second boundary device, a second approval message based on the adjusted first signal property of the second wireless signal, wherein the second approval message confirms the adjusted first signal property of the second wireless signal.

4. The method of claim 1, wherein the first Wi-Fi network comprises a public network.

5. The method of claim 1, wherein the first Wi-Fi network comprises a private wireless network.

6. The method of claim 1, wherein the first boundary device comprises a personal computer, a smartphone, or a router.

7. The method of claim 1, wherein the first signal property of the wireless signal comprises one or more of signal strength, channel interference, and frequency band interference.

8. An apparatus comprising:
   one or more processors; and
   a memory storing processor-executable instructions that, when executed by the one or more processors, cause the apparatus to:
   send, over a first Wi-Fi network using a first signal property, a wireless signal;
   receive, from a first boundary device, over a second Wi-Fi network separate from the first Wi-Fi network, first information related to the wireless signal;
   receive, from a second boundary device, over the second Wi-Fi network, second information related to the wireless signal; and
   adjust the first signal property based on the first information and the second information.

9. The apparatus of claim 8, wherein the processor-executable instructions that, when executed by the one or more processors, further cause the apparatus to:
   send, over the first Wi-Fi network using the adjusted first signal property, a second wireless signal; and
   receive, from the first boundary device, an approval message based on the adjusted first signal property of the second wireless signal, wherein the approval message confirms the adjusted first signal property of the second wireless signal.

10. The apparatus of claim 9, wherein the processor-executable instructions that, when executed by the one or more processors, further cause the apparatus to receive, from the second boundary device, a second approval message based on the adjusted first signal property of the second wireless signal, wherein the second approval message confirms the adjusted first signal property of the second wireless signal.

11. The apparatus of claim 8, wherein the first Wi-Fi network comprises a public network.

12. The apparatus of claim 8, wherein the first Wi-Fi network comprises a private wireless network.

13. The apparatus of claim 8, wherein the first boundary device comprises a personal computer, a smartphone, or a router.

14. The apparatus of claim 8, wherein the first signal property of the wireless signal comprises one or more of signal strength, channel interference, and frequency band interference.

15. One or more non-transitory computer-readable media storing processor-executable instructions that, when executed by at least one processor, cause the at least one processor to:
   send, over a first Wi-Fi network using a first signal property, a wireless signal;
   receive, from a first boundary device, over a second Wi-Fi network separate from the first Wi-Fi network, first information related to the wireless signal;
   receive, from a second boundary device, over the second Wi-Fi network, second information related to the wireless signal; and
   adjust the first signal property based on the first information and the second information.

16. The one or more non-transitory computer-readable media of claim 15, wherein the processor-executable instructions that, when executed by the at least one processor, further cause the at least one processor to:

send, over the first Wi-Fi network using the adjusted first signal property, a second wireless signal; and receive, from the first boundary device, an approval message based on the adjusted first signal property of the second wireless signal, wherein the approval message confirms the adjusted first signal property of the second wireless signal.

17. The one or more non-transitory computer-readable media of claim 16, wherein the processor-executable instructions that, when executed by the at least one processor, further cause the at least one processor to receive, from the second boundary device, a second approval message based on the adjusted first signal property of the second wireless signal, wherein the second approval message confirms the adjusted first signal property of the second wireless signal.

18. The one or more non-transitory computer-readable media of claim 15, wherein the first Wi-Fi network comprises a public network.

19. The one or more non-transitory computer-readable media of claim 15, wherein the first Wi-Fi network comprises a private wireless network.

20. The one or more non-transitory computer-readable media of claim 15, wherein the first boundary device comprises a personal computer, a smartphone, or a router.

21. The one or more non-transitory computer-readable media of claim 15, wherein the first signal property of the wireless signal comprises one or more of signal strength, channel interference, and frequency band interference.

* * * * *